United States Patent
Oishi

(10) Patent No.: US 9,609,328 B2
(45) Date of Patent: Mar. 28, 2017

(54) ELECTRONIC DEVICE AND METHOD

(71) Applicant: CANON KABUSHIKI KAISHA, Tokyo (JP)

(72) Inventor: Akihiro Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/538,049

(22) Filed: Nov. 11, 2014

(65) Prior Publication Data

US 2015/0130965 A1    May 14, 2015

(30) Foreign Application Priority Data

Nov. 13, 2013    (JP) ................... 2013-234963

(51) Int. Cl.
*H04N 19/124*    (2014.01)
*H04N 19/172*    (2014.01)
*H04N 19/13*    (2014.01)
*H04N 19/154*    (2014.01)
*H04N 9/73*    (2006.01)

(52) U.S. Cl.
CPC ........ *H04N 19/124* (2014.11); *H04N 19/13* (2014.11); *H04N 19/154* (2014.11); *H04N 19/172* (2014.11); *H04N 9/735* (2013.01)

(58) Field of Classification Search
CPC .... H04N 19/00–19/198; H04N 19/136; H04N 19/124; H04N 19/186; H04N 19/647; H04N 7/26563; H04N 9/07; H04N 9/077; H04N 9/735; H04N 9/69
USPC .................................................. 348/231.99
See application file for complete search history.

(56) References Cited

U.S. PATENT DOCUMENTS

| | | | |
|---|---|---|---|
| 9,106,911 B2* | 8/2015 | Kishigami | H04N 19/196 |
| 2008/0037880 A1* | 2/2008 | Lai | H04N 19/172 |
| | | | 382/232 |
| 2008/0158375 A1* | 7/2008 | Kakkori | G06T 1/20 |
| | | | 348/222.1 |
| 2009/0174811 A1* | 7/2009 | Sung | H04N 1/6058 |
| | | | 348/396.1 |
| 2011/0090381 A1* | 4/2011 | Cote | G06T 3/4015 |
| | | | 348/246 |
| 2011/0150411 A1 | 6/2011 | Sugiyama | |
| 2012/0229677 A1* | 9/2012 | Ugawa | H04N 5/23232 |
| | | | 348/234 |
| 2013/0010858 A1* | 1/2013 | Kishigami | H04N 19/196 |
| | | | 375/240.02 |
| 2014/0071233 A1* | 3/2014 | Lim | H04N 13/0018 |
| | | | 348/43 |

(Continued)

FOREIGN PATENT DOCUMENTS

JP        2011-130273 A      6/2011

*Primary Examiner* — Pritham Prabhakher
(74) *Attorney, Agent, or Firm* — Canon USA, Inc. I.P. Division

(57) ABSTRACT

An electronic device includes an image capture unit that generates first RAW image data; a compression unit that compresses the first RAW image data; a decompression unit that decompresses the compressed first RAW image data to generate second RAW image data; a development unit that generates first developed image data from the first RAW image data, and generates second developed image data from the second RAW image data; and a control unit that controls the compression unit based on the first developed image data and the second developed image data.

11 Claims, 5 Drawing Sheets

(56) References Cited

U.S. PATENT DOCUMENTS

2014/0093181 A1\* 4/2014 Nakayama .............. G06T 9/008
　　　　　　　　　　　　　　　　　　　　　　382/233
2015/0016510 A1\* 1/2015 Carlsson ................ H04N 19/15
　　　　　　　　　　　　　　　　　　　　　　375/240.03

\* cited by examiner

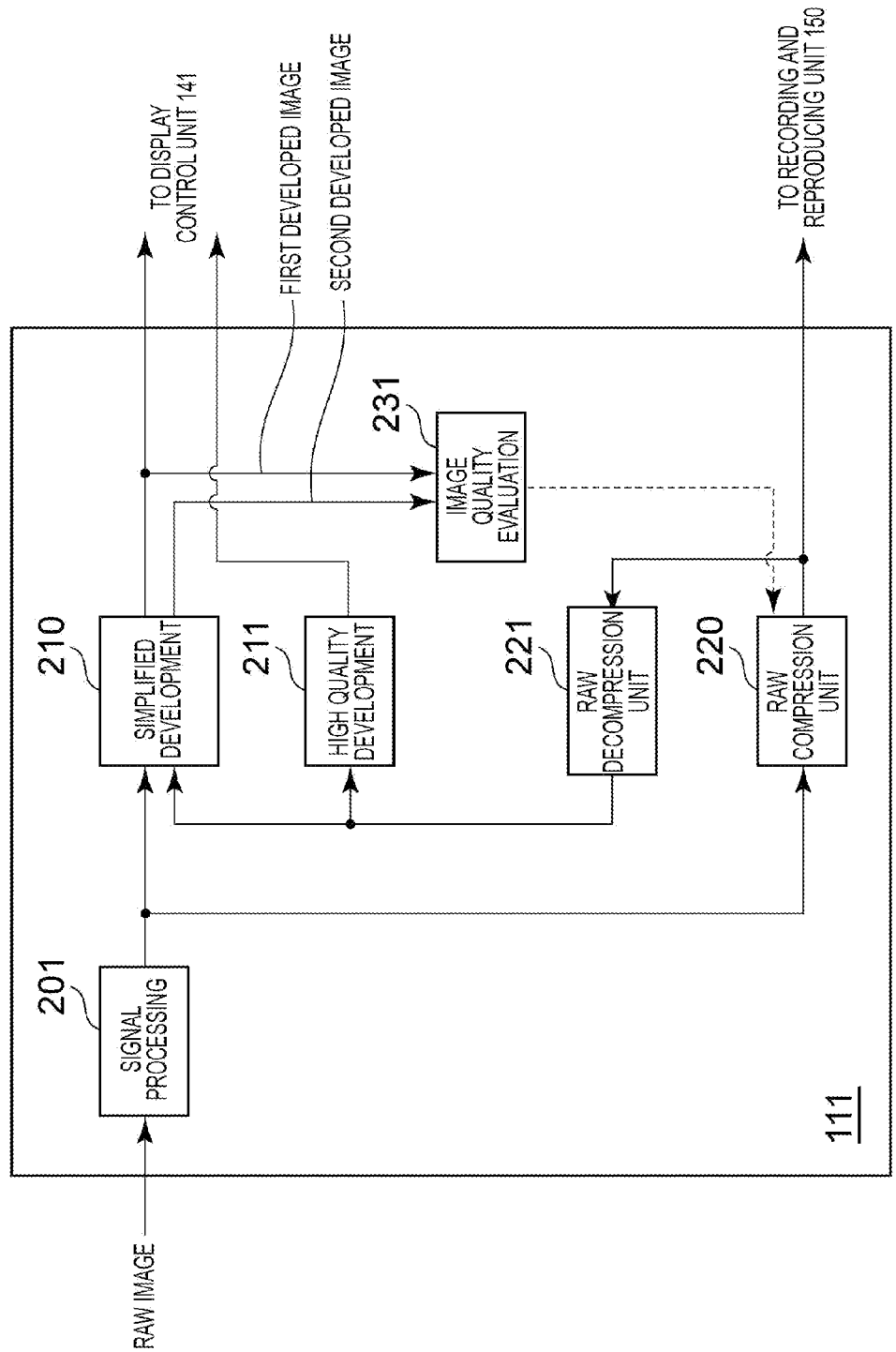

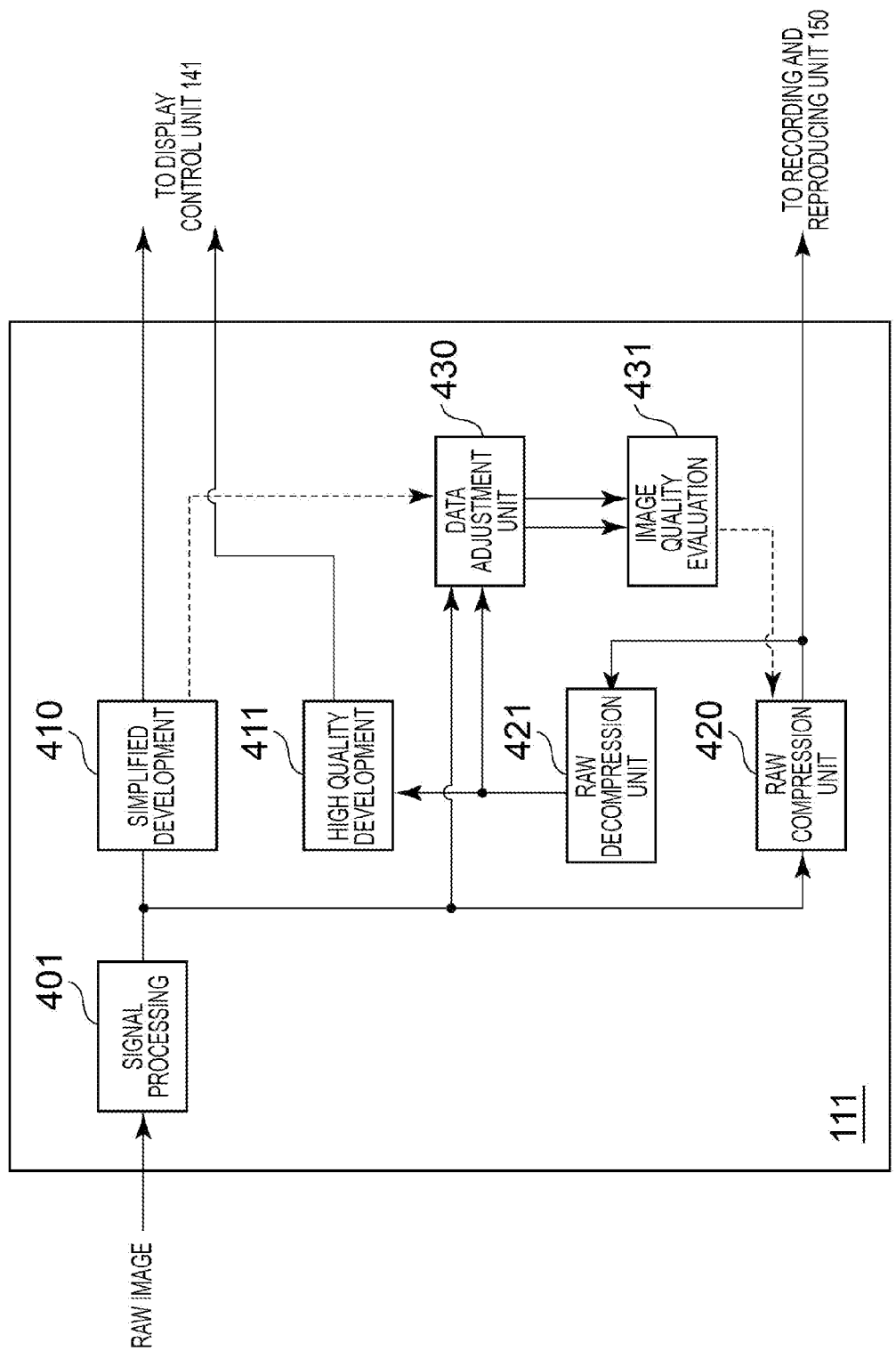

ELECTRONIC DEVICE AND METHOD

BACKGROUND

Field of the Invention

The present invention relates to an image processing apparatus, an image capture apparatus, an electronic device, a control method thereof, an image processing method, a program for causing a computer to execute these methods, and the like.

Description of the Related Art

Conventionally, as an image processing apparatus, an image capture apparatus that records image data obtained by imaging an object in a recording medium is known. Conventionally, the image capture apparatus applies a "development process" to a raw image ("RAW image") obtained with an imaging device (a CCD or a CMOS), converts the RAW image into luminance information and color difference information, then compresses these information by a compressing and encoding technique, such as JPEG or MPEG, to record these information in a recording medium. In recent years, an image capture apparatus has appeared, which can record the RAW image in a recording medium as it is in order to freely perform the "development process" later. However, the RAW image tends to become large in data size. Therefore, for example, as described in Japanese Patent Application Laid-Open No. 2011-130273, technologies of compressing RAW image data have been developed.

However, in Japanese Patent Application Laid-Open No. 2011-130273, data is compressed without evaluating image quality. Therefore, there is a problem that a code amount becomes too large with respect to image quality, or the image quality is deteriorated although the code amount is small.

SUMMARY

According to an aspect of the present invention, a new compression or encoding method of RAW image data is provided.

According to another aspect of the present invention, a new compression or encoding method that enables adjustment of an image quality and a code amount of RAW image data is provided.

According to another aspect of the present invention, there is provided an electronic device including: an image capture unit that generates first RAW image data; a compression unit that compresses the first RAW image data; a decompression unit that decompresses the compressed first RAW image data to generate second RAW image data; a development unit that generates first developed image data from the first RAW image data, and generates second developed image data from the second RAW image data; and a control unit that controls the compression unit based on the first developed image data and the second developed image data.

According to another aspect of the present invention, there is provided a method including: generating first RAW image data; causing a compression unit to compress the first RAW image data; decompressing the compressed first RAW image data to generate second RAW image data; generating first developed image data from the first RAW image data; generating second developed image data from the second RAW image data; and controlling the compression unit based on the first developed image data and the second developed image data.

Further features and aspects of the present invention will become apparent from the following description of exemplary embodiments.

BRIEF DESCRIPTION OF THE DRAWINGS

FIG. 2 is a diagram for illustrating an example of a configuration of an image processing unit in the first exemplary embodiment.

FIG. 4 is a diagram for illustrating an example of a configuration of an image processing unit in the second exemplary embodiment.

DESCRIPTION OF THE EMBODIMENTS

Exemplary embodiments, features, and aspects of the present invention will be described below with reference to the drawings.

Note that each function block described in the following exemplary embodiments is not necessarily individual hardware. That is, for example, functions of some function blocks may be executed by single hardware. Alternatively, a function of one function block or functions of a plurality of function blocks may be executed by a coordinating operation of some pieces of hardware. Furthermore, a function of each function block may be executed by a computer program loaded into a memory by a central processing unit (CPU).

First Exemplary Embodiment

An image capture apparatus will be described in the first and second exemplary embodiments as an example. However, any apparatus (including any electronic device) may be used as long as an apparatus can compress RAW image data. For example, a mobile phone, a smart phone, a tablet-type information terminal, a note-type information terminal, a computer, or the like, may be used.

An image capture apparatus in the first and second exemplary embodiments includes an image capture unit, an image processing unit, and a recording and reproducing unit. The image capture unit photoelectrically converts, with an imaging device, an optical image of an object acquired with a lens, and then converts an obtained analog image signal into a digital image signal with an AD (analog to digital) conversion unit. The digital image signal corresponds to an image in accordance with a Bayer array of a color filter of the imaging device, and is typically called RAW image data. Then, the image processing unit processes the RAW image data obtained by the image capture unit. For example, the image processing unit performs a development process of RAW image data, a compression process of RAW image data, a decompression process of compressed RAW image data, and the like. At this time, the image processing unit compares an image obtained by developing the RAW image data obtained by the image capture unit, and an image obtained by developing the RAW image data subjected to the compression process and then the decompression process, and the image processing unit controls a compression rate in the compression process. Then, the RAW image data compressed by the image processing unit is recorded in a recording medium by the recording and reproducing unit.

With such a configuration, the image capture apparatus in the first and second exemplary embodiments can bring the compression of the RAW image data close to optimum compression in which both of an image quality and a code amount are achieved.

Hereinafter, such an image capture apparatus will be described.

<Overall Configuration>

First, an example of a configuration of an image capture apparatus 100 in the first and second exemplary embodiments will be described with reference to FIG. 1.

Figure 1:
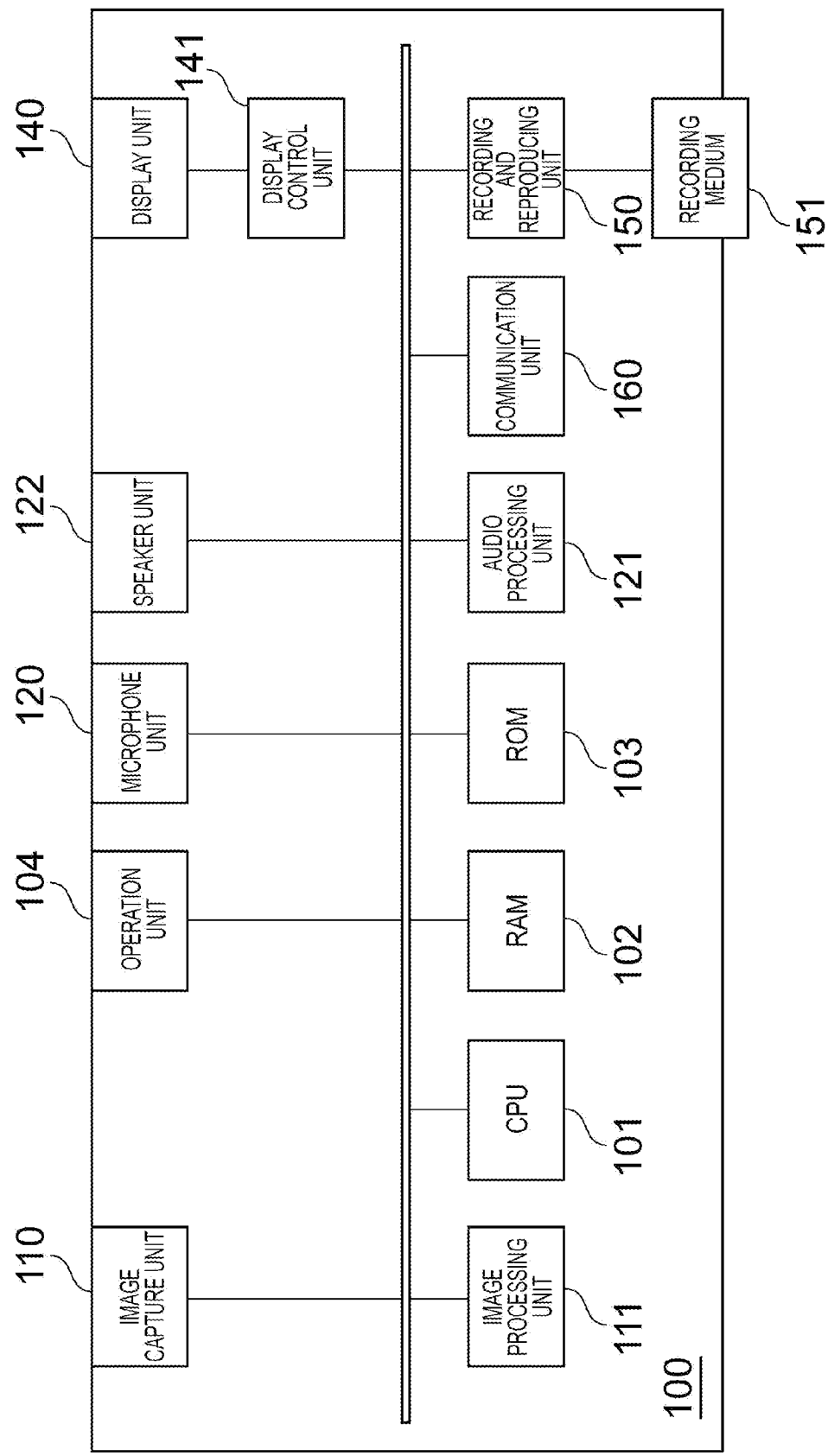
FIG. 1 is a diagram for illustrating an example of a configuration of an image capture apparatus in first and second exemplary embodiments.

An image capture apparatus 100 includes, as illustrated in FIG. 1, a CPU 101, a RAM 102, a ROM 103, and an operation unit 104. Also, the image capture apparatus 100 includes an image capture unit 110, an image processing unit 111, a microphone unit 120, an audio processing unit 121, and a speaker unit 122. Furthermore, the image capture apparatus 100 includes a display unit 140, a display control unit 141, a recording and reproducing unit 150, a recording medium 151, and a communication unit 160. Note that the CPU is an abbreviation of central processing unit. RAM is an abbreviation of random access memory. ROM is an abbreviation of read only memory.

In the image capture apparatus 100, the CPU 101 loads various programs recorded in the ROM 103 into the RAM 102 as a working memory, and controls blocks of the image capture apparatus 100 according to the programs. The operation unit 104 includes switches that input various operations of a power supply button, a recording button, a zoom adjustment button, an autofocus button, a menu display button, a mode selection switch, a determination button, and the like. Furthermore, the operation unit may be any type of manipulator, such as a cursor key, a pointing device, a touch panel, a dial, or the like. The operation unit 104 transmits an operation signal the CPU 101 if the key, button or touch panel is operated by a user. Various function icons displayed on the display unit 140 are selected and operated, whereby functions are appropriately allocated to operation members of the operation unit 104 in each situation, and operation members of the operation unit 104 function as various function buttons. As the function buttons, there are, for example, an end button, a return button, an image forward button, a jump button, a narrowing-down button, an attribute change button, and the like. For example, if a menu button is pressed, a menu screen which can be used to set various settings is displayed on the display unit 140. The user can intuitively set the various settings using the menu screen displayed on the display unit 140, a four direction button of up, down, right, and left directions, and a SET button. Note that the operation unit 104 may be a touch panel capable of detecting touch to the display unit 140. As the touch panel, any of various methods may be used, such as a resistance film method, an electrostatic capacitance method, a surface acoustic wave method, an infrared method, an electromagnetic induction method, an image recognition method, and an optical sensor method.

Figure 5:
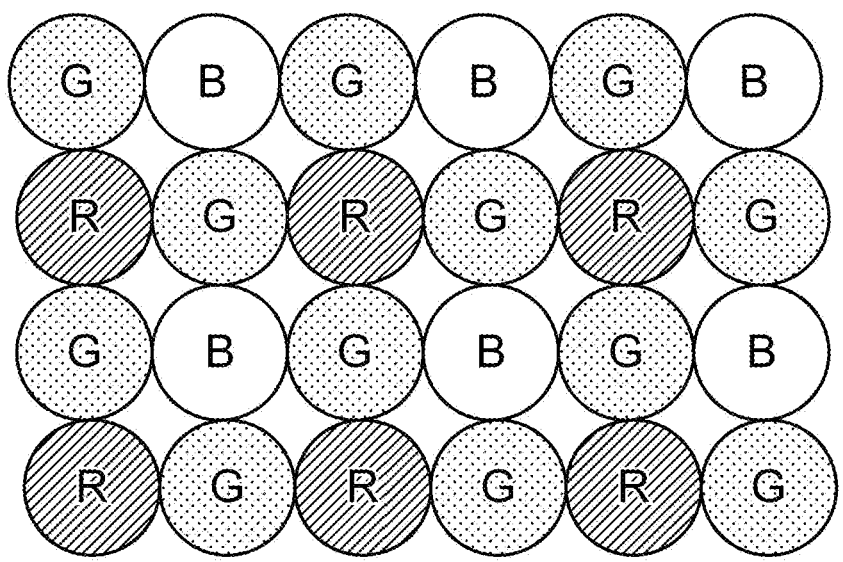
FIG. 5 is a diagram for illustrating an example of a color filter array of an imaging device in the first and second exemplary embodiments.

The image capture unit 110 converts an optical image of an object taken through a lens into an analog image signal by controlling a light amount with a diaphragm and using an imaging device such as a CCD sensor or a CMOS sensor, converts the obtained analog image signal into a digital image signal, and temporarily stores the converted digital image signal in the RAM 102. The digital image signal generated by the image capture unit 110 is an electrical signal obtained such that a light that has been transmitted color filters of red, green, and blue (RGB) laid out on pixels of the imaging device is converted. FIG. 5 illustrates an example of the color filters laid out on the imaging device. As illustrated in FIG. 5, the color filters laid out on the imaging device have a structure in which red (R), green (G), and blue (B) are laid out on the respective pixels in a mosaic manner, and one pixel of red, one pixel of blue, and two pixels of green form one set and are regularly laid out on each 2×2 pixels (four pixels). Such layout of the pixels is typically called Bayer array. That is, the digital image signal generated by the image capture unit 110 is a digital image signal of the Bayer array, and an image corresponding to the digital image signal is called RAW image. In the first and second exemplary embodiments, image data obtained by the image capture unit 110 is called RAW image data. At the time of recording, RAW image data obtained by the image capture unit 110 is stored in the RAM 102.

The image processing unit 111 processes the RAW image data stored in the RAM 102 at the time of recording, and processes compressed RAW image data read from the recording medium 151 described below at the time of reproduction. For example, the image processing unit 111 performs a decompression process of the compressed RAW image data, a development process of the RAW image data, a compression process of the RAW image data, and the like. The image processing unit 111 transmits the RAW image data subjected to the development process to the display control unit 141, and transmits the compressed RAW image data to the recording and reproducing unit 150 and the communication unit 160. Furthermore, the image processing unit 111 may perform a restoration process of the RAW image data or an image quality adjustment process of the RAW image data. The process performed by the image processing unit 111 will be described below.

The audio processing unit 121 processes audio data obtained by the microphone unit 120 at the time of recording, and processes compressed or non-compressed audio data read from the recording medium 151 described below at the time of reproduction. For example, the audio processing unit 121 performs a decompression process of the compressed audio data, a level adjustment process of the audio data, a compression process of the audio data, and the like. The audio processing unit 121 transmits the processed audio data to the recording and reproducing unit 150 and the communication unit 160, and transmits the processed audio data to the speaker unit 122 at the time of reproduction. Note that the microphone unit 120 includes a non-directional microphone built in a housing of the image capture apparatus 100, and an AD (analog to digital) conversion unit. The microphone unit 120 collects ambient sounds with the microphone, and converts an acquired analog audio signal into a digital signal with the AD conversion unit. As an audio compression method, the audio processing unit 121 uses a typically known audio compression method, such as AC3 or AAC. The speaker unit 122 includes a speaker and a DA (digital to analog) conversion unit.

The display unit 140 comprises a liquid crystal display device, an organic EL (electroluminescence) display device, or the like, and displays an image by control of the display control unit 141. The display unit 140 may be any device as long as the device can provide an image to the user, such as a LED (light emitting diode) display. The display control unit 141 displays an image on the display unit 140 based on image data processed by the image processing unit 111.

Furthermore, the display control unit 141 may apply at least one of image signal processes such as a matrix transformation, a brightness adjustment, a contrast adjustment, a gamma adjustment, a chroma gain adjustment, and a sharpness adjustment to a video signal based on the digital image signal to be displayed on the display unit 140.

At the time of recording, the recording and reproducing unit 150 records the compressed RAW image data and audio data, which have been processed by the image processing unit 111, in the recording medium 151. At the time of reproduction, the recording and reproducing unit 150 reproduces the compressed RAW image data and audio data recorded in the recording medium 151 at the time of reproduction. Note that, in the following description, description about a process of the audio data is omitted. At the time of recording, the recording and reproducing unit 150 writes the compressed RAW image data to the recording medium 151 with various types of information, such as an image capture date, information related to compression, and setting of the image capture unit 110. Note that the recording and reproducing unit 150 records the compressed RAW image data in the recording medium as a file in the form conforming to a file format, such as FAT or exFAT, when recording the compressed RAW image data in the recording medium 151. Furthermore, the recording medium 151 may be a recording medium built in the image capture apparatus 100, or may be a detachable recording medium. Examples of the recording medium 151 include any format of recording medium, such as a hard disk, an optical disk, a magneto-optical disk, a CD-R, a DVD-R, a magnetic tape, a non-volatile semiconductor memory, and a flash memory. If the detachable recording medium is used, the recording and reproducing unit 150 includes a mechanism for mounting and discharging the detachable recording medium.

The communication unit 160 transmits/receives a control signal, the image data, the audio data, various data, and the like to/from an external device which is different from the image capture apparatus 100, and can connection to the external device regardless of wired connection or wireless connection. Note that the communication method may be any method.

Here, each of the image processing unit 111, the audio processing unit 121, the display control unit 141, and the recording and reproducing unit 150 may be a microcomputer equipped with a program that executes the above-described functions. Furthermore, the CPU 101 may load a program for executing the above-described process, which is recorded in the ROM 103, into the RAM 102, and execute the program.

<Image Processing Unit 111>

Next, a configuration and an operation of the image processing unit 111 in the first exemplary embodiment will be described.

The image processing unit 111 in the first exemplary embodiment performs a process of compressing the RAW image data obtained by the image capture unit 110. The image processing unit 111 compresses the RAW image data at a predetermined compression rate, and decompresses the compressed RAW image data. Then, the image processing unit 111 develops, with the same parameters, both of the RAW image data obtained by the image capture unit 110 and the RAW image data compressed and then decompressed by the image processing unit 111, and the image processing unit 111 compares these two developed image data. Then, the image processing unit 111 evaluates image qualities of these two image data, and controls a compression rate in the compression process according to the image qualities. In the first exemplary embodiment, a PSNR (peak signal-to-noise ratio) is used as an example of the image quality evaluation. However, an evaluation scheme other than the PSNR may be used.

FIG. 2 is a block diagram for illustrating an example of a configuration of the image processing unit 111 in the first exemplary embodiment. The image processing unit 111 of the first exemplary embodiment includes, as illustrated in FIG. 2, a signal processing unit 201, a simplified development unit 210, a high quality development unit 211, a RAW compression unit 220, a RAW decompression unit 221, and an image quality evaluation unit 231.

The signal processing unit 201 executes a restoration process of the RAW image data. The restoration process includes a process of interpolating a target pixel, which corresponds to a dropped out pixel in the imaging device of the image capture unit 110, by using values of peripheral pixels, or a process of subtracting a predetermined offset value from a value of a pixel having low reliability.

Each of the simplified development unit 210 and the high quality development unit 211 performs a process of developing the RAW image data. In the simplified development unit 210, a development process is performed with a more limited condition than a development process performed by the high quality development unit 211. Each of the simplified development unit 210 and the high quality development unit 211 performs a development process, which includes a white balance adjustment process, a deBayer process (demosaic process), and the like, to the RAW image data. Other than the above processes, the development process performed in each of the simplified development unit 210 and the high quality development unit 211 includes a process of converting image data subjected to the deBayer process into signals of a luminance and a color difference, a process of removing a noise included in each signal, a process of correcting optical distortion, a gamma correction process, and the like. Note that the "development process" may indicate one of the deBayer process (demosaic process), the white balance adjustment process, and the gamma correction process, or may indicate at least one of these processes. Note that the simplified development unit 210 performs the development process simplified than the development process performed by the high quality development unit 211 at a speed higher than the high quality development unit 211. For example, the simplified development unit simplifies the development process by reducing a size of the RAW image data into a predetermined size (for example, 2000×2000 or less), before performing the development process. Furthermore, regarding the process of correcting optical distortion or the process of removing a noise, the simplified development unit 210 can simplify the development process by performing these processes without performing an analysis of image data captured before and after image data to be corrected. In contrast, the high quality development unit 211 performs the development process without limiting a size of the RAW image data, and/or the high quality development unit 211 performs a highly precise correction process and noise reduction process by performing an analysis of image data captured before and after image data to be corrected.

As described above, the high quality development unit 211 has a larger processing load than the simplified development unit 210, and thus the high quality development unit 211 may not be operated at the time of recording but the high quality development unit 211 may be performed the development process at the time of reproduction or after completion of recording. On the other hand, the simplified development unit 210 has a smaller processing load than the high quality development unit 211, and thus the simplified development unit 210 may be performed the development process at the time of recording. In doing so, an increase in (a peak of) power consumption at the time of recording can be suppressed low. Note that the description will be given, assuming that the first exemplary embodiment includes two development units such as the simplified development unit 210 and the high quality development unit 211. However, the first exemplary embodiment may have a configuration in which one development unit selects one of operation modes to perform one of a simplified development process and a high quality development process.

The RAW compression unit 220 compresses data amount of the RAW image data processed in the signal processing unit 201. The RAW compression unit 220 compresses the RAW image data by using compressing and encoding techniques including a wavelet transformation, a differential encoding, and the like. In the first exemplary embodiment, the RAW compression unit 220 has a configuration in which information subjected to the wavelet transformation is quantized, as used in JPEG 2000 or Motion JPEG 2000. Therefore, in the RAW compression unit 220, the compression rate can be increased by a decrease in the number of quantization steps, and the compression rate can be decreased and an image quality can be improved by an increase in the number of quantization steps. Note that the compression rate can be changed not only by the increase in the number of quantization steps, but also by changing of an accuracy of an arithmetic coding. Therefore, a method of changing the compression rate is not limited to a changing of the number of quantization steps. Furthermore, in the first exemplary embodiment, the RAW compression unit 220 compresses the RAW image data using the wavelet transformation. However, the RAW image data may be compressed by an existing technology, such as H.265, H.264, MPEG, or MPEG 2.

At the time of recording, the RAW decompression unit 221 decompresses the compressed RAW image data which is generated by the RAW compression unit 220. At the time of reproduction, the RAW decompression unit 221 decompresses the compressed RAW image data which is read from the recording medium 151 by the recording and reproducing unit 150. For example, the RAW decompression unit 221 decompresses the compressed RAW image data by using decoding techniques including a wavelet inverse transform, a differential decoding, and the like. In the first exemplary embodiment, the RAW decompression unit 221 decompresses information subjected to the wavelet transformation and the quantization, and thus the RAW decompression unit 221 has a configuration in which dequantization and wavelet inverse transform are performed.

Next, the image quality evaluation unit 231 compares two developed image data output from the simplified development unit 210. To be specific, the image quality evaluation unit 231 compares first developed image data which has been output from the signal processing unit 201 and then developed in the simplified development unit 210, and second developed image data which has been compressed by the RAW compression unit 220, decompressed by the RAW decompression unit 221, and then developed in the simplified development unit 210. At this time, the simplified development unit 210 performs the development process with the same parameters. The image quality evaluation unit 231 compares the input first developed image data and second developed image data, and the image quality evaluation unit 231 calculates a "peak signal-to-noise ratio" (typically, called as PSNR). Then, the image quality evaluation unit 231 controls the compression rate in the RAW compression unit 220 according to the calculated "peak signal-to-noise ratio (PSNR). For example, an image quality of the second developed image data is obtained from the calculated PSNR.

With such a configuration, in case of compressing the RAW image data without developing the RAW image data, the image processing unit 111 can control the compression rate to become a more optimum compression rate based on the image quality of the of the second developed image data.

Next, an operation of the image processing unit 111 at the time of recording will be described.

If a recording operation is started, the RAW image data output from the image capture unit 110 is transmitted to the image processing unit 111. In the image processing unit 111, first, the signal processing unit 201 performs a restoration process of the RAW image data. Next, the RAW image data processed by the signal processing unit 201 is transmitted to the simplified development unit 210 and the RAW compression unit 220. The RAW compression unit 220 compresses the RAW image data at a compression rate corresponding to an instruction of the image quality evaluation unit 231. The compressed RAW image data generated by the RAW compression unit 220 is transmitted to the RAW decompression unit 221 and the recording and reproducing unit 150. The RAW decompression unit 221 decompresses the compressed RAW image data which is generated by the RAW compression unit 220. The RAW decompression unit 221 transmits the decompressed RAW image data to the simplified development unit 210.

The simplified development unit 210 develops both of the RAW image data processed by the signal processing unit 201 and the RAW image data decompressed by the RAW decompression unit 221 with the same parameters. Then, the simplified development unit 210 transmits, to the image quality evaluation unit 231, the first developed image data obtained such that the RAW image data processed by the signal processing unit 201 is developed to the image quality evaluation unit 231, and the simplified development unit 210 transmits, to the image quality evaluation unit 231, the second developed image data obtained such that the RAW image data decompressed by the RAW decompression unit 221 is developed. Note that the first developed image data is transmitted to the display control unit 141, and is displayed on the display unit 140 under control of the display control unit 141.

The image quality evaluation unit 231 compares the first developed image data and the second developed image data, and the image quality evaluation unit 231 calculates the "peak signal-to-noise ratio (PSNR)". Then, if the "peak signal-to-noise ratio (PSNR)" exceeds a predetermined upper limit, the PSNR indicates that the image quality of the second developed image data is favorable, and thus even if the compression rate is increased, the image quality of the second developed image data is not deteriorated so much. Therefore, if the "peak signal-to-noise ratio (PSNR)" exceeds the predetermined upper limit, the image quality evaluation unit 231 outputs an instruction to increase the compression rate to the RAW compression unit 220. If the PSNR falls below a predetermined lower limit, the PSNR indicates that the image quality of the second developed image data is more deteriorated than a predetermined level. Therefore, the image quality evaluation unit 231 outputs an instruction to decrease the compression rate to the RAW compression unit 220 in order to make the image quality of the second developed image data favorable. Note that, if the "peak signal-to-noise ratio (PSNR)" does not exceed the above-described predetermined upper limit and does not fall below the predetermined lower limit, the compression rate is not changed.

If the instruction to increase the compression rate is input from the image quality evaluation unit 231, the RAW compression unit 220 is operated to decrease the number of quantization steps in the compression process. If the instruction to decrease the compression rate is input from the image quality evaluation unit 231, the RAW compression unit 220 is operated to increase the number of quantization steps. As described above, a method of increasing the compression rate may be a method other than a method of changing the number of quantization steps.

With the above operation, in a case where the input RAW image data is compressed at the time of recording without developing the RAW image data, the image processing unit 111 can perform the compression process in consideration of the image quality of the second developed image data. To realize the compression process, in the first exemplary embodiment, the image quality evaluation unit 231 compares the first developed image data obtained such that the RAW image data obtained by the image capture unit 110 is developed, and the second developed image data obtained such that the RAW image data is compressed, decompressed, and then developed, and the image quality evaluation unit 231 evaluates the image quality of the second developed image data. Then, the image processing unit 111 controls the compression process of the RAW image data so that the image quality of the second developed image data falls within predetermined levels. As described above, the image capture apparatus 100 in the first exemplary embodiment can bring the compression of the RAW image data close to optimum compression in which an image quality and a code amount are achieved.

In the first exemplary embodiment, the description is performed without limiting in a case of capturing a moving image or capturing a still image. However, the first exemplary embodiment is applicable to both of capturing a moving image and capturing a still image. In a case of capturing a moving image, a compression rate determined by the image quality evaluation unit 231 is applied to a compression of the next frame.

Furthermore, the development parameters used in the simplified development unit 210 include a parameter corresponding to the white balance adjustment value that is set at the time of capturing an image, and/or a parameter that is automatically set by the CPU 101 of the image capture apparatus 100 based on a result of an analysis of a captured image.

Here, the reason why the two developed image data are compared will be described as a supplementary explanation. In short, it is because even if the compression process is performed such that an error between the RAW image data before compression and the compressed and decompressed RAW image data falls within a predetermined area, an error between the two developed image data will be larger than the predetermined area. Therefore, in the first exemplary embodiment, the compression rate is controlled such that the error between the two developed images falls within the predetermined area, instead of simply controlling the compression rate such that the error between the RAW image data before compression and the compressed and decompressed RAW image data falls within the predetermined area.

Figure 3A:
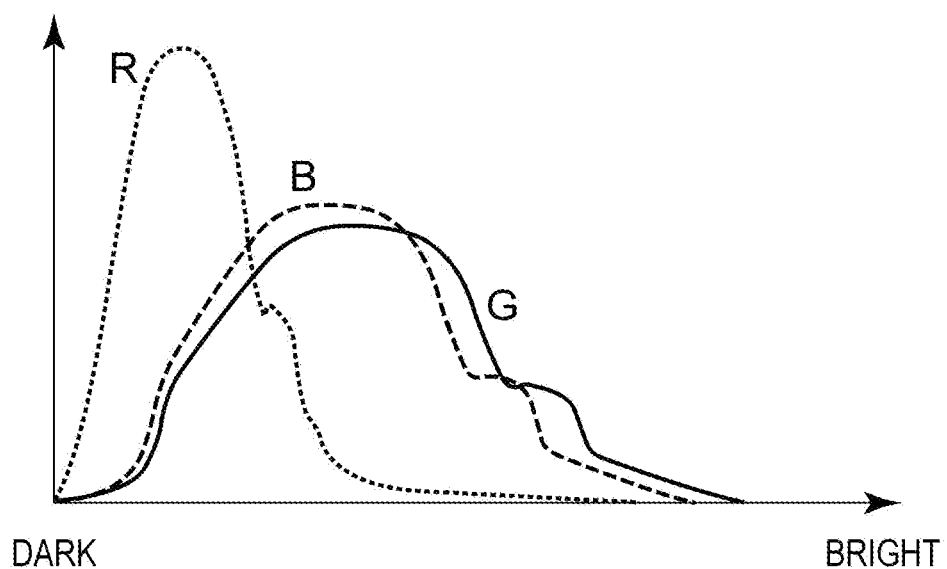
FIG. 3A is a diagram for illustrating an example of characteristics of a pre-processing image.
Figure 3B:
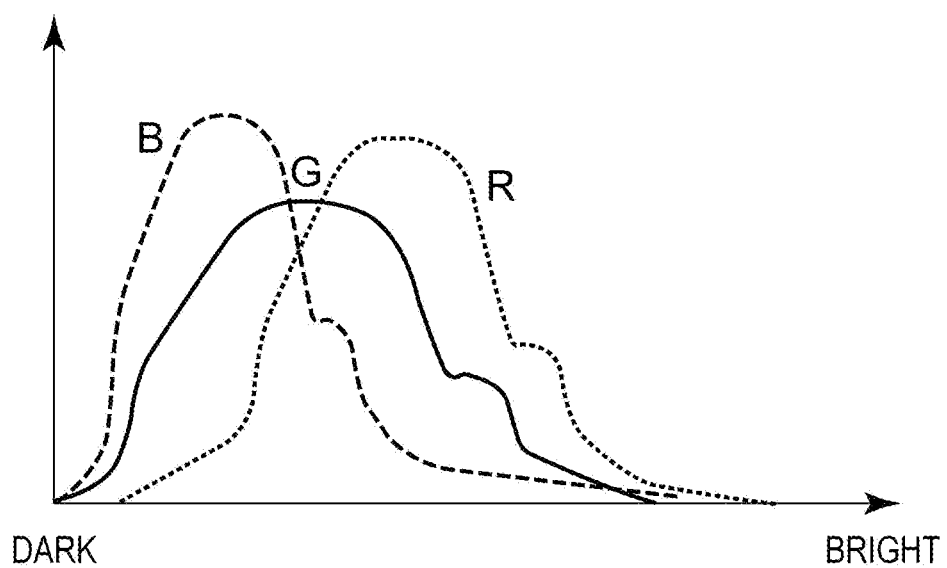
FIG. 3B is a diagram for illustrating another example of characteristics of a pre-processing image.

FIG. 3A illustrates histograms of RGB components of the RAW image data before the white balance adjustment process is performed, the RAW image data being obtained if a specific object is captured under certain ambient light. FIG. 3B illustrates histograms of RGB components of the RAW image data before the white balance adjustment process is performed, the RAW image data being obtained if the specific object is captured under ambient light, which is different from the case of FIG. 3A. If the white balance adjustment process is appropriately performed in the simplified development unit 210 and in the high quality development unit 211, both cases have nearly the same histograms after adjustment because these histograms are the results of capturing the same object. For example, if the specific object is an object with an achromatic color, the RGB components as a result of the white balance adjustment process become equal values.

However, when focusing on the R component, for example, the R component is darker than the G component in FIG. 3A. Therefore, when comparing the RAW image data obtained by the image capture unit 110 and the RAW image data after compression and decompression in a state before development, in the R component, the level of a target signal is low and thus a ratio of an error (noise) component may sometimes become lower than that of after development. If this image is developed, the level of the R component is corrected by the white balance adjustment process, and thus the small error (noise) component may sometimes become large. As described above, if comparing the RAW image data before development, optimum comparison may not be able to be performed regarding the image quality, which is changed by the development process, such as the white balance adjustment process and the gamma correction process. Therefore, in the first exemplary embodiment, the images after development are compared and the compression rate of the RAW image data is adjusted, even if the RAW image data is compressed, instead of comparing the RAW image data before compression and the compressed and decompressed RAW image data.

Note that the first exemplary embodiment is described, in which RAW image data developed by the simplified development unit 210 are compared in the image quality evaluation unit 231. However, RAW image data developed in the high quality development unit 211 may be compared.

Furthermore, specific regions or arbitrary parts of developed image data may be compared in the image quality evaluation unit 231. In the simplified development unit 210, RAW image data processed by the signal processing unit 201, and RAW image data decompressed by the RAW decompression unit 221 are developed with the same parameters. The parameters at this time may include a level adjustment parameter with respect to color component data in the white balance adjustment process, a gamma correction parameter in the gamma correction process, and the like.

Furthermore, the first exemplary embodiment is described that RAW image data developed in the high quality development unit 211 and the simplified development unit 210 are used for display. However, for example, RAW image data developed in the high quality development unit 211 and the simplified development unit 210 may be compressed as still images or moving images. The compression method used at this time may be JPEG 2000 or Motion JPEG 2000 using wavelet transformation, or may be any compression method such as H.264, H.265, MPEG, or MPEG 2.

Note that the first exemplary embodiment is described using the image capture apparatus as an example. However, any device may be used as long as the device can compress RAW image data. For example, a mobile phone, a smart phone, a tablet type information terminal, a note type information terminal, a computer, or the like may be employed.

Second Exemplary Embodiment

Next, a second exemplary embodiment will be described. In the second exemplary embodiment, an image capture apparatus will be described, similarly to the first exemplary embodiment. A basic configuration of an image capture apparatus 100 in the second exemplary embodiment is similar to that of the image capture apparatus 100 in the first exemplary embodiment (see FIG. 1). Therefore, description of the basic configuration of the image capture apparatus 100 in the second exemplary embodiment is omitted, assuming that the basic configuration of the image capture apparatus 100 in the second exemplary embodiment is similar to that of the image capture apparatus 100 in the first exemplary embodiment.

In the second exemplary embodiment, a configuration and an operation of an image processing unit 111 is different from the first exemplary embodiment, and thus description of the image processing unit 111 in the second exemplary embodiment will be described.

<Image Processing Unit 111>

The image processing unit 111 in the second exemplary embodiment performs a process of compressing RAW image data obtained by an image capture unit 110. The image processing unit 111 compresses the RAW image data at a predetermined compression rate, and decompresses the compressed RAW image data. Then, the image processing unit 111 adjusts, using development parameters, both of the RAW image data obtained by the image capture unit 110 and the RAW image data compressed and then decompressed by the image processing unit 111, and the image processing unit 111 compares these two adjusted image data. Then, the image processing unit 111 evaluates image qualities of these two image data, and controls a compression rate in a compression process according to the image qualities. In the second exemplary embodiment, a PSNR (peak signal-to-noise ratio) is used as an example of the image quality evaluation. However, an evaluation method other than the above may be used.

FIG. 4 is a block diagram for illustrating an example of a configuration of the image processing unit 111 in the second exemplary embodiment. The image processing unit 111 in the second exemplary embodiment includes, as illustrated in FIG. 4, a signal processing unit 401, a simplified development unit 410, a high quality development unit 411, a RAW compression unit 420, a RAW decompression unit 421, a data adjustment unit 430, and an image quality evaluation unit 431.

The signal processing unit 401 executes a restoration process of the RAW image data. The restoration process includes a process of interpolating a target pixel, which corresponds to a dropped out pixel in the imaging device of the image capture unit 110, by using values of peripheral pixels, or a process of subtracting a predetermined offset value from a value of a pixel having low reliability.

Each of the simplified development unit 410 and the high quality development unit 411 perform a process of developing the RAW image data. The simplified development unit 410, a development process is performed with a more limited condition than a development process performed by the high quality development unit 411. Each of the simplified development unit 410 and the high quality development unit 411 performs a development process, which includes a white balance adjustment process, a deBayer process (demosaic process), and the like, to the RAW image data. Other than the above processes, the development process performed in each of the simplified development unit 410 and the high quality development unit 411 includes a process of converting image data subjected to the deBayer process into signals of a luminance and a color difference, a process of removing a noise included in each signal, a process of correcting optical distortion, a gamma correction process, and the like. Note that the "development process" may indicate one of the deBayer process (demosaic process), the white balance adjustment process, and the gamma correction process, or may indicate at least one of these processes. Note that the simplified development unit 410 performs the development process simplified than the development process performed by the high quality development unit 411 at a speed higher than the high quality development unit 411. For example, the simplified development unit simplifies the development process by reducing a size of the RAW image data into a predetermined size (for example, 2000×2000 or less), before performing the development process. Furthermore, regarding the process of correcting optical distortion or the process of removing a noise, the simplified development unit 410 can simplify the development process by performing these processes without performing an analysis of image data captured before and after image data to be corrected. In contrast, the high quality development unit 411 performs the development process without limiting a size of the RAW image data, and/or the high quality development unit 411 performs a highly precise correction process and noise reduction process by performing an analysis of image data captured before and after image data to be corrected.

As described above, the high quality development unit 411 has a larger processing load than the simplified development unit 410, and thus the high quality development unit 411 may not be operated at the time of recording but the high quality development unit 411 may be performed the development process at the time of reproduction or after completion of recording. On the other hand, the simplified development unit 410 has a smaller processing load than the high quality development unit 411, and thus the simplified development unit 410 may be performed the development process at the time of recording. In doing so, an increase in (a peak of) power consumption at the time of recording can be suppressed low. Note that the description will be given, assuming that the second exemplary embodiment includes two development units such as the simplified development unit 410 and the high quality development unit 411. However, the second exemplary embodiment may have a configuration in which one development unit selects one of operation modes to perform one of a simplified development process and a high quality development process.

The RAW compression unit 420 compresses data amount of the RAW image data processed in the signal processing unit 401. The RAW compression unit 420 compresses the RAW image data by using compressing and encoding techniques including a wavelet transformation, a differential encoding, and the like. In the second exemplary embodiment, the RAW compression unit 420 has a configuration in which information subjected to the wavelet transformation is quantized, as used in JPEG 2000 or Motion JPEG 2000. Therefore, in the RAW compression unit 420, the compression rate can be increased by a decrease in the number of quantization steps, and the compression rate can be decreased and an image quality can be improved by an increase in the number of quantization steps. Note that the compression rate can be changed not only by the increase in the number of quantization steps, but also by changing of an accuracy of an arithmetic coding. Therefore, a method of changing the compression rate is not limited to a changing of the number of quantization steps. Furthermore, in the first exemplary embodiment, the RAW compression unit 420 compresses the RAW image data using the wavelet transformation. However, the RAW image data may be compressed by an existing technology, such as H.265, H.264, MPEG, or MPEG 2.

At the time of recording, the RAW decompression unit 421 decompresses the compressed RAW image data which is generated by the RAW compression unit 420. At the time of reproduction, the RAW decompression unit 421 decompresses the compressed RAW image data which is read from the recording medium 151 by the recording and reproducing unit 150. For example, the RAW decompression unit 421 decompresses the compressed RAW image data by using decoding techniques including a wavelet inverse transform, a differential decoding, and the like. In the second exemplary embodiment, the RAW decompression unit 421 decompresses information subjected to the wavelet transformation and the quantization, and thus the RAW decompression unit 421 has a configuration in which dequantization and wavelet inverse transform are performed.

Next, the data adjustment unit 430 adjusts first RAW image data and second RAW image data based on development parameters used in the simplified development unit 410. To be specific, the data adjustment unit 430 adjusts the first RAW image data and the second RAW image data according to level correction parameters of respective colors in the white balance adjustment, and adjusts the first RAW image data and the second RAW image data according to a correction parameter in the gamma correction process. The first RAW image data to be adjusts by the data adjustment unit 430 is the RAW image data processed in the signal processing unit 401, and the second RAW image data to be adjusts by the data adjustment unit 430 is the RAW image data compressed by the RAW compression unit 420 and then decompressed by the RAW decompression unit 421. The data adjustment unit 430 transmits the first RAW image data and the second RAW image data adjusted by the data adjustment unit 430 to the image quality evaluation unit 431.

The image quality evaluation unit 431 compares two unprocessed RAW image data output from the data adjustment unit 430. The image quality evaluation unit 431 compares the first RAW image data obtained such that the RAW image data output from the signal processing unit 401 is adjusted by the data adjustment unit 430, and the second RAW image data obtained such that the RAW image data compressed by the RAW compression unit 420, decompressed by the RAW decompression unit 421, and then adjusted by the data adjustment unit 430. The image quality evaluation unit 431 compares the input first RAW image data and the input second RAW image data, and the image quality evaluation unit 431 calculates a "peak signal-to-noise ratio" (typically, called PSNR). Then, the image quality evaluation unit 431 controls the compression rate in the RAW compression unit 420 according to the calculated "peak signal-to-noise ratio (PSNR)". For example, an image quality of the second RAW image data adjusted by the data adjustment unit 430 is obtained from the calculated PSNR.

With such a configuration, in case of compressing the RAW image data without developing the RAW image data, the image processing unit 111 can control the compression rate to become a more optimum compression rate based on an image quality of the second RAW image data adjusted by using the development parameters.

Next, an operation of the image processing unit 111 at the time of recording will be described.

If a recording operation is started, the RAW image data output from the image capture unit 110 is transmitted to the image processing unit 111. In the image processing unit 111, first, the signal processing unit 401 performs a restoration process of the RAW image data. Next, the RAW image data processed by the signal processing unit 401 is transmitted to the simplified development unit 410, the data adjustment unit 430, and the RAW compression unit 420. The RAW compression unit 420 compresses the RAW image data at a compression rate corresponding to an instruction of the image quality evaluation unit 431. The compressed RAW image data generated by the RAW compression unit 420 is transmitted to the RAW decompression unit 421 and the recording and reproducing unit 150. The RAW decompression unit 421 decompresses the compressed RAW image data which is generated by the RAW compression unit 420. The RAW decompression unit 421 transmits the decompressed RAW image data to the data adjustment unit 430.

The simplified development unit 410 develops the RAW image data processed by the signal processing unit 401, and transmits developed image data generated by the simplified development unit 410 to the display control unit 141. Meanwhile, the simplified development unit 410 transmits the development parameters to the data adjustment unit 430.

The data adjustment unit 430 acquires both of the first RAW image data output from the signal processing unit 401, and the second RAW image data compressed by the RAW compression unit 420 and then decompressed by the RAW decompression unit 421, and the data adjustment unit 430 adjusts the first RAW image data and the RAW image data by using the development parameters transmitted from the simplified development unit 410.

The image quality evaluation unit 431 compares the first RAW image data adjusted by the data adjustment unit 430 and the second RAW image data adjusted by the data adjustment unit 430, and the image quality evaluation unit 431 calculates a "peak signal-to-noise ratio (PSNR)". Then, if the "peak signal-to-noise ratio (PSNR)" exceeds a predetermined upper limit, the PSNR indicates that the image quality of the second RAW image data adjusted by the data adjustment unit 430 is favorable, and thus even if the compression rate is increased, the image quality of the second RAW image data adjusted by the data adjustment unit 430 is not deteriorated so much. Therefore, if the "peak signal-to-noise ratio (PSNR)" exceeds the predetermined upper limit, the image quality evaluation unit 431 outputs an instruction to increase the compression rate to the RAW compression unit 420. If the PSNR falls below a predetermined lower limit, the PSNR indicates that the image quality of the second RAW image data adjusted by the data adjustment unit 430 is more decreased than a predetermined level. Therefore, the image quality evaluation unit 431 outputs an instruction to decrease the compression rate to the RAW compression unit 420 in order to make the image quality of the second RAW image data adjusted by the data adjustment unit 430 favorable. Note that, if the "peak signal-to-noise ratio (PSNR)" does not exceed the predetermined upper limit and does not fall below the predetermined lower limit, the compression rate is not changed.

If the instruction to increase the compression rate is input from the image quality evaluation unit 431, the RAW compression unit 420 is operated to decrease the number of quantization steps in the compression process. If the instruction to decrease the compression rate is input from the image quality evaluation unit 431, the RAW compression unit 420 is operated to increase the number of quantization steps. As described above, a method of increasing the compression rate may be a method other than a method of changing the number of quantization steps.

With the above operation, in a case where the input RAW image data is compressed at the time of recording without developing the RAW image data, the image capture apparatus 100 can perform the compression process in consideration of the image quality of the second RAW image data adjusted by the data adjustment unit 430. To realize the compression process, in the second exemplary embodiment, the data adjustment unit 430 adjusts the first RAW image data and the second RAW image data by using the development parameters which is used in the development process of the RAW image data obtained by the image capture unit 110, and the image quality evaluation unit 431 compares the first RAW image data adjusted by the data adjustment unit 430 and the second RAW image data adjusted by the data adjustment unit 430. To be specific, the image quality evaluation unit 431 compares the first RAW image data obtained such that the RAW image data obtained by the image processing unit 111 is adjusted by the data adjustment unit 430 using the development parameters, and the second RAW image data obtained such that the compressed RAW image data decompressed by the RAW decompression unit 421 and then adjusted by the data adjustment unit 430 using the imaging parameters, and the image quality evaluation unit 431 evaluates the image quality of the second RAW image data adjusted by the data adjustment unit 430. Then, the image processing unit 111 controls the compression process of the RAW image data so that the image quality of the second RAW image data adjusted by the data adjustment unit 430 falls within predetermined levels. As described above, the image processing unit 111 in the second exemplary embodiment can bring the compression of the RAW image data close to optimum compression in which both of an image quality and a code amount are achieved.

In the second exemplary embodiment, the description is performed without limiting in a case of capturing a moving image or capturing a still image. However, the second exemplary embodiment is applicable to both of capturing a moving image and capturing a still image. In a case of capturing a moving image, a compression rate determined by the image quality evaluation unit 431 is applied to a compression of the next frame.

Furthermore, the development parameters used in the simplified development unit 410 include a parameter corresponding to the white balance adjustment value that is set at the time of capturing an image, and/or a parameter that is automatically set by the CPU 101 of the image capture apparatus 100 based on a result of an analysis of a captured image.

Note that the second exemplary embodiment is described, in which RAW image data adjusted using the development parameters used in the simplified development unit 410 are compared in the image quality evaluation unit 431. However, RAW image data adjusted using the development parameters used in the high quality development unit 411 may be compared.

Furthermore, specific regions of RAW image data may be compared in the image quality evaluation unit 431. The development parameters in the simplified development unit 410 may be include a level adjustment parameter with respect to color component data in the white balance adjustment process, a gamma correction parameter in the gamma correction process, and the like.

Furthermore, the second exemplary embodiment is described that RAW image data developed in the high quality development unit 411 and the simplified development unit 410 are used for display. However, for example, RAW image data developed in the high quality development unit 411 and the simplified development unit 410 may be compressed as still images or moving images. The compression method used at this time may be JPEG 2000 or Motion JPEG 2000 using wavelet transformation, or may be any compression method such as H.264, H.265, MPEG, or MPEG 2.

Note that the second exemplary embodiment is described using the image capture apparatus as an example. However, any device may be used as long as the device can compress RAW image data. For example, a mobile phone, a smart phone, a tablet type information terminal, a note type information terminal, a computer, or the like may be employed.

Third Exemplary Embodiment

The above-described first and second exemplary embodiments can be realized as software by a computer (or a CPU (central processing unit), a MPU (microprocessing unit), or the like) of a system or a device.

Note that a computer program for realizing the above-described first and second exemplary embodiments may have any form as long as the computer program can be read by a computer. For example, the computer program can be configured from, but is not limited to, an object code, a program executed by an interpreter, script data supplied to an OS (operating system), and the like. The computer program for realizing the above-described first and second exemplary embodiments is supplied to the computer with a storage medium or by wired/wireless communication. As the storage medium for supplying the program, there are a flexible disk, a hard disk, a magnetic storage medium such as a magnetic tape, an optical/magneto-optical storage medium such as an MO, a CD, and DVD, and a non-volatile semiconductor memory.

As a method of supplying the computer program using wired/wireless communication, there is a method of using a server on a computer network. In this case, a data file (a program file) that could serve as the computer program is stored in the server. The program file may be an executable file or may be a source code. Then, the program file is supplied by being downloaded to a client computer that has accessed the server. In this case, the program file is divided into a plurality of segment files, and the segment files can be distributed in different servers.

Furthermore, the computer program for realizing the above-described embodiments is encrypted and a storage medium in which the encrypted computer program is stored is distributed, and key information for solving the encryption is supplied to the user who satisfies a predetermined condition, and installation of the computer program to a computer owned by the user. The key information can be supplied by being downloaded from a website through the Internet. Also, the computer program for realizing the above-described embodiments may use a function of the OS operating on the computer. Furthermore, a part of the computer program for realizing the above-described embodiment may be configured from firmware such as an extension board and the like mounted to the computer, or may be executed by a CPU (central processing unit) included in the extension board.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims the benefit of Japanese Patent Application No. 2013-234963, filed Nov. 13, 2013, which is hereby incorporated by reference herein in its entirety.

What is claimed is:

1. An electronic device comprising:
an image capture unit that obtains first RAW image data;
a compression unit that compresses the first RAW image data;
a decompression unit that decompresses the compressed first RAW image data into second RAW image data;
a development unit that generates first developed image data from the first RAW image data obtained by the image capture unit, and generates second developed image data from the second RAW image data, the second RAW image data being RAW image data, generated by compressing the first RAW image data obtained by the image capture unit by the compression unit and subsequently decompressing the compressed first RAW image data by the decompression unit, the development unit using identical image development parameters for both the first RAW image data obtained by the image capture unit and the second RAW image data compressed by the compression unit and then decompressed by the decompression unit; and
an image quality evaluation unit for evaluating an image quality based on the first developed image data and the second developed image data such that if image quality exceeds a predetermined upper threshold, a compression rate is increased, and if the image quality is lower than a predetermined lower threshold, the compression rate is decreased,
wherein the image quality is evaluated based on a calculated ratio value,
wherein the development unit reduces the first RAW image data to generate the first developed image data, and reduces the second RAW image data to generate the second developed image data.

2. The electronic device according to claim 1, wherein the development unit applies a white balance adjustment to the first developed image data, and applies a white balance adjustment to the second developed image data.

3. The electronic device according to claim 1, wherein the development unit applies a gamma correction to the first developed image data, and applies a gamma correction to the second developed image data.

4. The electronic device according to claim 1, wherein the image quality evaluation unit compares at least a part of the first developed image data and at least a part of the second developed image data to control the compression unit.

5. The electronic device according to claim 1, wherein the compression unit changes the number of quantization steps in the compression unit to control the compression unit.

6. A method comprising:
obtaining first RAW image data from an image capture unit;
causing a compression unit to compress the first RAW image data;
decompressing the compressed first RAW image data into second RAW image data;
generating first developed image data from the first RAW image data obtained from the image capture unit;
generating second developed image data from the second RAW image data, the second RAW image data being RAW image data generated by compressing the first RAW image data obtained by the image capture unit and subsequently decompressing the compressed first RAW image data, wherein the first developed image data and second developed image data uses identical image development parameters for both the first RAW image data obtained by the image capture unit and the second RAW image data compressed and then decompressed; and
evaluating an image quality based on the first developed image data and the second developed image data such that if the image quality exceeds a predetermined upper threshold, a compression rate is increased, and if the image quality is lower than a predetermined lower threshold, the compression rate is decreased,
wherein the image quality is evaluated based on a calculated ratio value,
reducing the first RAW image data to generate the first developed image data, and reducing the second RAW image data to generate the second developed image data.

7. The method according to claim 6, further comprising:
applying a white balance adjustment to the first developed image data; and
applying a white balance adjustment to the second developed image data.

8. The method according to claim 6, further comprising:
applying a gamma correction to the first developed image data; and
applying a gamma correction to the second developed image data.

9. The method according to claim 6, further comprising:
comparing at least a part of the first developed image data and at least a part of the second developed image data to control the compression unit.

10. The method according to claim 6, further comprising:
changing the number of quantization steps in the compression unit to control the compression unit.

11. A non-transitory storage medium that stores a program for causing a computer to execute a method, the method comprising:
obtaining first RAW image data from an image capture unit;
causing a compression unit to compress the first RAW image data;
decompressing the compressed first RAW image data into second RAW image data;
generating first developed image data from the first RAW image data obtained from the image capture unit;
generating second developed image data from the second RAW image data, the second RAW image data being RAW image data generated by compressing the first RAW image data obtained by the image capture unit and subsequently decompressing the compressed first RAW image data, wherein the first developed image data and second developed image data uses identical image development parameters for both the first RAW image data obtained by the image capture unit and the second RAW image data compressed and then decompressed; and
evaluating an image quality based on the first developed image data and the second developed image data such that if the image quality exceeds a predetermined upper threshold, a compression rate is increased, and if the image quality is lower than a predetermined lower threshold, the compression rate is decreased,
wherein the image quality is evaluated based on a calculated ratio value,
reducing the first RAW image data to generate the first developed image data and reducing the second RAW image data to generate the second developed image data.

* * * * *